United States Patent
Pang et al.

(10) Patent No.: US 10,178,618 B2
(45) Date of Patent: Jan. 8, 2019

(54) METHOD, APPARATUS, AND SYSTEM FOR SENDING AND RECEIVING PAGING MESSAGE

(71) Applicant: HUAWEI TECHNOLOGIES CO., LTD., Shenzhen (CN)

(72) Inventors: Lingli Pang, Shanghai (CN); Xiaoxiao Zheng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 198 days.

(21) Appl. No.: 15/099,140

(22) Filed: Apr. 14, 2016

(65) Prior Publication Data

US 2016/0234781 A1  Aug. 11, 2016

Related U.S. Application Data

(63) Continuation of application No. PCT/CN2013/085344, filed on Oct. 16, 2013.

(51) Int. Cl.
*H04W 68/02* (2009.01)
*H04W 76/28* (2018.01)
(Continued)

(52) U.S. Cl.
CPC ... *H04W 52/0219* (2013.01); *H04W 52/0216* (2013.01); *H04W 68/005* (2013.01);
(Continued)

(58) Field of Classification Search
CPC ...................... H04W 52/0216; H04W 52/0219
(Continued)

(56) References Cited

U.S. PATENT DOCUMENTS 6,728,537 B1   4/2004  Abdesselem et al.
2004/0176112 A1* 9/2004  Beckmann .......... H04W 68/025
                                                         455/458

(Continued)

FOREIGN PATENT DOCUMENTS

CN    1565140 A    1/2005
CN    1835640 A    9/2006
(Continued)

OTHER PUBLICATIONS

International Search report dated Jul. 8, 2014 in corresponding International Application No. PCT/CN2013/085344.
(Continued)

*Primary Examiner* — Joshua L Schwartz
(74) *Attorney, Agent, or Firm* — Staas & Halsey LLP

(57) ABSTRACT

A method includes: selecting a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel; calculating a paging occasion for the paged user equipment; and on the paging occasion, sending a page indicator to the paged user equipment through the selected PICH channel and sending a paging message to the paged user equipment through the paging-message-bearer channel, where the paging message carries paging data. The quantity of times that user equipment receives an unnecessary paging message is reduced, and the amount of electricity consumed by the user equipment is further reduced.

7 Claims, 5 Drawing Sheets

(51) Int. Cl.
*H04W 52/02* (2009.01)
*H04W 68/00* (2009.01)
*H04W 72/00* (2009.01)
*H04W 72/04* (2009.01)
*H04W 4/70* (2018.01)

(52) U.S. Cl.
CPC ......... *H04W 68/02* (2013.01); *H04W 72/005* (2013.01); *H04W 72/0446* (2013.01); *H04W 4/70* (2018.02); *H04W 76/28* (2018.02); *Y02D 70/00* (2018.01); *Y02D 70/21* (2018.01); *Y02D 70/24* (2018.01)

(58) Field of Classification Search
USPC ...................................................... 455/452.1
See application file for complete search history.

(56) References Cited

U.S. PATENT DOCUMENTS

2011/0195709 A1   8/2011   Christensson et al.
2016/0234804 A1*  8/2016   Hu .................. H04W 68/02
2018/0027424 A1*  1/2018   Chen ............... H04W 76/048
                                                    455/450

FOREIGN PATENT DOCUMENTS

| | | |
|---|---|---|
| CN | 101835268 A | 9/2010 |
| CN | 102143582 A | 8/2011 |
| EP | 2 369 883 A1 | 9/2011 |
| WO | 2011/100497 A1 | 8/2011 |
| WO | 2013/007193 A1 | 1/2013 |

OTHER PUBLICATIONS

Chinese Office Action dated Sep. 5, 2017 in corresponding Chinese Patent Application No. 201380001650.1.
International Search Report dated Jul. 8, 2014 in corresponding International Patent Application No. PCT/CN2013/085344.
Extended European Search Report dated Aug. 19, 2016 in corresponding European Patent Application No. 13895501.8.

* cited by examiner

METHOD, APPARATUS, AND SYSTEM FOR SENDING AND RECEIVING PAGING MESSAGE

CROSS-REFERENCE TO RELATED APPLICATIONS

This application is a continuation of International Application No. PCT/CN2013/085344, filed on Oct. 16 2013, which is hereby incorporated by reference in its entirety.

TECHNICAL FIELD

Embodiments of the present invention relate to the field of communications, and in particular, to a method, an apparatus, and a system for sending and receiving a paging message.

BACKGROUND

In a communications system, when a network side pages a user equipment in an idle state, a URA_PCH (UTRAN registration area paging channel) state, or a CELL_PCH (CELL paging channel) state, the network side sends a paging message.

Currently, a method for sending a paging message is provided, which is specifically: calculating, by a network side, a paging occasion for paged user equipment, and sending a paging message to the paged user equipment on the paging occasion, where the paging message carries an identity of the paged user equipment and paging data. When the paging occasion for the user equipment arrives, the user equipment listens to a PICH (page indicator channel) channel, and parses a page indicator value in the PICH channel. If the page indicator value that is in the PICH channel and obtained by means of parsing is 1, the user equipment receives the paging message. The user equipment determines whether an identity of the user equipment and an identity carried in the paging message are the same; if the identity of the user equipment and the identity carried in the paging message are the same, keeps the paging data; and if the identity of the user equipment and the identity carried in the paging message are different, discards the paging data.

In a process of implementing the present invention, the inventor finds that at least the following problem exists in the prior art:

Because a cell includes a relatively large quantity of user equipments, and it may possibly occur that paging occasions of multiple user equipments arrive at a same time and the multiple user equipments will each listen to a PICH channel, if page indicator values obtained by means of parsing by the multiple user equipments are all 1, the multiple user equipments each receive the paging message; after the paging message is received, however, it is determined that the paging message is not sent for a user equipment that receives the paging message; as a result, another user equipment than the paged user equipment, in the multiple user equipments, receives an unnecessary paging message, leading to a relatively large quantity of electricity consumed by the user equipment.

SUMMARY

To resolve the problem in the prior art, embodiments of the present invention provide a method, an apparatus, and a system for sending and receiving a paging message. The technical solutions are as follows:

According to a first aspect, a method for sending a paging message is provided, where the method includes:

selecting a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel;

calculating a paging occasion for the paged user equipment; and on the paging occasion, sending a page indicator to the paged user equipment through the selected PICH channel and sending a paging message to the paged user equipment through the paging-message-bearer channel, where the paging message carries paging data.

With reference to the first aspect, in a first possible implementation manner of the first aspect, the selecting a paging channel for a paged user equipment according to rule information includes:

if the quantity of page indicator channels is greater than or equal to 2 and a discontinuous reception period length of the paged user equipment is less than or equal to the preset threshold, selecting a first paging channel; and if the quantity of page indicator channels is greater than or equal to 2 and the discontinuous reception period length of the paged user equipment is greater than the preset threshold, selecting a second paging channel.

With reference to the first aspect or the first possible implementation manner of the first aspect, in a second possible implementation manner of the first aspect, the selecting a paging channel for a paged user equipment according to rule information includes:

if the quantity of page indicator channels is greater than or equal to 2, acquiring, according to a user equipment type of the paged user equipment, a corresponding paging channel from the correspondence between a user equipment type and a paging channel.

With reference to the second possible implementation manner of the first aspect, in a third possible implementation manner of the first aspect, the acquiring, according to a user equipment type of the paged user equipment, a corresponding paging channel from the correspondence between a user equipment type and a paging channel includes:

if the paged user equipment is a non-machine-type communications device, selecting the first paging channel; and if the paged user equipment is a machine-type communications device, selecting the second paging channel.

With reference to the first aspect, in a fourth possible implementation manner of the first aspect, the calculating a paging occasion for the paged user equipment includes:

if a discontinuous reception period length of the paged user equipment is greater than the preset threshold and/or the paged user equipment is a machine-type communications device, calculating the paging occasion for the paged user equipment according to an international mobile subscriber identity IMSI of the paged user equipment, a first time length, and the discontinuous reception period length of the paged user equipment.

With reference to the first aspect, in a fifth possible implementation manner of the first aspect, when the paging data is change information of a system broadcast message, the paged user equipment includes a first user equipment and a second user equipment, where the first user equipment is a user equipment that selects a first paging channel, and the second user equipment is a user equipment that selects a second paging channel; and the, on the paging occasion, sending a page indicator to the paged user equipment through the selected PICH channel and sending a paging message to the paged user equipment through the paging-message-bearer channel includes:

sending a page indicator to the first user equipment through a first PICH channel, and sending the change information of the system broadcast message to the first user equipment through the paging-message-bearer channel; and sending a page indicator to the second user equipment through a second PICH channel, and sending the change information of the system broadcast message to the second user equipment through the paging-message-bearer channel.

With reference to the fifth possible implementation manner of the first aspect, in a sixth possible implementation manner of the first aspect, the change information of the system broadcast message includes a first system frame number SFN and/or a change time point of the system broadcast message.

With reference to the first aspect, in a seventh possible implementation manner of the first aspect, before the, on the paging occasion, sending a page indicator to the paged user equipment through the selected PICH channel and sending a paging message to the paged user equipment through the paging-message-bearer channel, the method further includes:

sending a first time length and/or the preset threshold to a user equipment of a cell; or sending the first time length and/or the correspondence between a user equipment type and a paging channel to the user equipment of the cell.

According to a second aspect, a method for receiving a paging message is provided, where the method includes:

acquiring rule information included in a system broadcast message, where the rule information includes a quantity of page indicator channels and further includes a preset threshold and/or a correspondence between a user equipment type and a paging channel;

selecting a paging channel according to the rule information, where the paging channel includes a page indicator channel PICH channel or includes a PICH channel and a paging-message-bearer channel;

calculating a paging occasion, listening to the selected PICH channel within the paging occasion, and parsing a page indicator value in the PICH channel that is listened to; and if the page indicator value is 1, receiving, from the paging-message-bearer channel, a paging message sent by a network side, where the paging message carries paging data.

With reference to the second aspect, in a first possible implementation manner of the second aspect, the selecting a paging channel according to the rule information includes:

if the quantity of page indicator channels is greater than or equal to 2, acquiring, according to a user equipment type of paged user equipment, a corresponding paging channel from the correspondence between a user equipment type and a paging channel.

With reference to the second aspect, in a second possible implementation manner of the second aspect, the selecting a paging channel according to the rule information includes:

if a discontinuous reception period length of a user equipment is greater than the preset threshold, selecting a second paging channel.

With reference to the second possible implementation manner of the second aspect, in a third possible implementation manner of the second aspect, the calculating a paging occasion includes:

calculating the paging occasion according to an international mobile subscriber identity IMSI, a first time length, and a discontinuous reception period length of the paged user equipment.

With reference to the third possible implementation manner of the second aspect, in a fourth possible implementation manner of the second aspect, the method further includes:

acquiring, from the system broadcast message, the discontinuous reception period length of the paged user equipment and/or the first time length.

With reference to the second aspect, in a fifth possible implementation manner of the second aspect, when the paging data is change information of the system broadcast message, after the receiving, from the paging-message-bearer channel, a paging message sent by a network side, the method further includes:

receiving, according to the change information of the system broadcast message, a changed system broadcast message sent by the network side, where the change information of the system broadcast message includes a first system frame number SFN and/or a change time point of the system broadcast message.

With reference to the fifth possible implementation manner of the second aspect, in a sixth possible implementation manner of the second aspect, the receiving, according to the change information of the system broadcast message, a changed system broadcast message sent by the network side includes:

comparing a current time point with the change time point included in the change information of the system broadcast message;

if the current time point is later than or equal to the change time point of the system broadcast message, receiving the changed system broadcast message sent by the network side; and if the current time point is earlier than the change time point of the system broadcast message, continuing waiting and receiving, at the change time point of the system broadcast message, the changed system broadcast message sent by the network side.

With reference to the fifth possible implementation manner of the second aspect, in a seventh possible implementation manner of the second aspect, the receiving, according to the change information of the system broadcast message, a changed system broadcast message sent by the network side includes:

acquiring a second SFN at which the change information of the system broadcast message is received;

if the first SFN is greater than or equal to the second SFN, receiving, at the first SFN according to scheduling information, the changed system broadcast message sent by the network side, where a master information block MIB of the system broadcast message or a scheduling block of the system broadcast message includes the scheduling information; and if the first SFN is less than the second SFN, receiving, according to the scheduling information at a first SFN included in a next SFN period, the changed system broadcast message sent by the network side.

With reference to the seventh possible implementation manner of the second aspect, in an eighth possible implementation manner of the second aspect, the method further includes:

if a third SFN corresponding to a current time point does not reach the first SFN and uplink data needs to be sent, acquiring the MIB of the system broadcast message; and if the acquired MIB is different from a MIB that has been stored, determining that the system broadcast message changes, and acquiring the changed system broadcast message.

With reference to the fifth possible implementation manner of the second aspect, in a ninth possible implementation manner of the second aspect, the receiving, according to the change information of the system broadcast message, a changed system broadcast message sent by the network side includes:

after receiving the change information of the system broadcast message, acquiring a MIB of the system broadcast message; and if the acquired MIB is different from a MIB that has been stored, receiving the changed system broadcast message sent by the network side.

According to a third aspect, an apparatus for sending a paging message is provided, where the apparatus includes:

a first selecting module, configured to select a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel;

a first calculating module, configured to calculate a paging occasion for the paged user equipment; and a first sending module, configured to send, on the paging occasion, a page indicator to the paged user equipment through the selected PICH channel, and send, on the paging occasion, a paging message to the paged user equipment through the paging-message-bearer channel, where the paging message carries paging data.

With reference to the third aspect, in a first possible implementation manner of the third aspect, the first selecting module includes:

a first selecting unit, configured to: if the quantity of page indicator channels is greater than or equal to 2 and a discontinuous reception period length of the paged user equipment is less than or equal to the preset threshold, select a first paging channel; and a second selecting unit, configured to: if the quantity of page indicator channels is greater than or equal to 2 and the discontinuous reception period length of the paged user equipment is greater than the preset threshold, select a second paging channel.

With reference to the third aspect or the first possible implementation manner of the third aspect, in a second possible implementation manner of the third aspect, the first selecting module includes:

a first acquiring unit, configured to: if the quantity of page indicator channels is greater than or equal to 2, acquire, according to a user equipment type of the paged user equipment, a corresponding paging channel from the correspondence between a user equipment type and a paging channel.

With reference to the second possible implementation manner of the third aspect, in a third possible implementation manner of the third aspect, the first acquiring unit includes:

a first selecting subunit, configured to: if the paged user equipment is a non-machine-type communications device, select the first paging channel; and a second selecting subunit, configured to: if the paged user equipment is a machine-type communications device, select the second paging channel.

With reference to the third aspect, in a fourth possible implementation manner of the third aspect, the first calculating module is specifically configured to: if a discontinuous reception period length of the paged user equipment is greater than the preset threshold and/or the paged user equipment is a machine-type communications device, calculate the paging occasion for the paged user equipment according to an international mobile subscriber identity IMSI of the paged user equipment, a first time length, and the discontinuous reception period length of the paged user equipment.

With reference to the third aspect, in a fifth possible implementation manner of the third aspect, when the paging data is change information of a system broadcast message, the paged user equipment includes first user equipment and second user equipment, where the first user equipment is a user equipment that selects a first paging channel, and the second user equipment is a user equipment that selects a second paging channel; and the first sending module includes:

a first sending unit, configured to send a page indicator to the first user equipment through a first PICH channel, and send the change information of the system broadcast message to the first user equipment through the paging-message-bearer channel; and a second sending unit, configured to send a page indicator to the second user equipment through a second PICH channel, and send the change information of the system broadcast message to the second user equipment through the paging-message-bearer channel.

With reference to the fifth possible implementation manner of the third aspect, in a sixth possible implementation manner of the third aspect, the change information of the system broadcast message includes a first system frame number SFN and/or a change time point of the system broadcast message.

With reference to the third aspect, in a seventh possible implementation manner of the third aspect, the apparatus further includes:

a second sending module, configured to send a first time length and/or the preset threshold to a user equipment of a cell; or a third sending module, configured to send the first time length and/or the correspondence between a user equipment type and a paging channel to the user equipment of the cell.

According to a fourth aspect, an apparatus for receiving a paging message is provided, where the apparatus includes:

a first acquiring module, configured to acquire rule information included in a system broadcast message, where the rule information includes a quantity of page indicator channels and further includes a preset threshold and/or a correspondence between a user equipment type and a paging channel;

a second selecting module, configured to select a paging channel according to the rule information, where the paging channel includes a page indicator channel PICH channel or includes a PICH channel and a paging-message-bearer channel;

a second calculating module, configured to calculate a paging occasion, listen to the selected PICH channel within the paging occasion, and parse a page indicator value in the PICH channel that is listened to; and a first receiving module, configured to: if the page indicator value is 1, receive, from the paging-message-bearer channel, a paging message sent by a network side, where the paging message carries paging data.

With reference to the fourth aspect, in a first possible implementation manner of the fourth aspect, the second selecting module includes:

a second acquiring unit, configured to: if the quantity of page indicator channels is greater than or equal to 2, acquire, according to a user equipment type of the paged user equipment, a corresponding paging channel from the correspondence between a user equipment type and a paging channel.

With reference to the fourth aspect, in a second possible implementation manner of the fourth aspect, the second selecting module includes:

a third selecting unit, configured to: if a discontinuous reception period length of a user equipment is greater than the preset threshold, select a second paging channel.

With reference to the second possible implementation manner of the fourth aspect, in a third possible implementation manner of the fourth aspect, the second calculating module includes:

a calculating unit, configured to calculate the paging occasion according to an international mobile subscriber identity IMSI, a first time length, and a discontinuous reception period length of paged user equipment.

With reference to the third possible implementation manner of the fourth aspect, in a fourth possible implementation manner of the fourth aspect, the apparatus further includes:

a second acquiring module, configured to acquire, from the system broadcast message, the discontinuous reception period length of the paged user equipment and/or the first time length.

With reference to the fourth aspect, in a fifth possible implementation manner of the fourth aspect, when the paging data is change information of the system broadcast message, the apparatus further includes:

a second receiving module, configured to receive, according to the change information of the system broadcast message, a changed system broadcast message sent by the network side, where the change information of the system broadcast message includes a first system frame number SFN and/or a change time point of the system broadcast message.

With reference to the fifth possible implementation manner of the fourth aspect, in a sixth possible implementation manner of the fourth aspect, the second receiving module includes:

a comparing unit, configured to compare a current time point with the change time point included in the change information of the system broadcast message;

a first receiving unit, configured to: if the current time point is later than or equal to the change time point of the system broadcast message, receive the changed system broadcast message sent by the network side; and a second receiving unit, configured to: if the current time point is earlier than the change time point of the system broadcast message, continue waiting and receive, at the change time point of the system broadcast message, the changed system broadcast message sent by the network side.

With reference to the fifth possible implementation manner of the fourth aspect, in a seventh possible implementation manner of the fourth aspect, the second receiving module includes:

a third acquiring unit, configured to acquire a second SFN at which the change information of the system broadcast message is received;

a third receiving unit, configured to: if the first SFN is greater than or equal to the second SFN, receive, at the first SFN according to scheduling information, the changed system broadcast message sent by the network side, where a master information block MIB of the system broadcast message or a scheduling block of the system broadcast message includes the scheduling information; and a fourth receiving unit, configured to: if the first SFN is less than the second SFN, receive, according to the scheduling information at a first SFN included in a next SFN period, the changed system broadcast message sent by the network side.

With reference to the seventh possible implementation manner of the fourth aspect, in an eighth possible implementation manner of the fourth aspect, the apparatus further includes:

a third acquiring module, configured to: if a third SFN corresponding to a current time point does not reach the first SFN and uplink data needs to be sent, acquire the MIB of the system broadcast message; and a fourth acquiring module, configured to: if the acquired MIB is different from a MIB that has been stored, determine that the system broadcast message changes, and acquire the changed system broadcast message.

With reference to the fifth possible implementation manner of the fourth aspect, in a ninth possible implementation manner of the fourth aspect, the second receiving module includes:

a fifth receiving unit, configured to: after receiving the change information of the system broadcast message, acquire a MIB of the system broadcast message; and a sixth receiving unit, configured to: if the acquired MIB is different from a MIB that has been stored, receive the changed system broadcast message sent by the network side.

According to a fifth aspect, an apparatus for sending a paging message is provided, where the apparatus includes a first memory and a first processor, configured to perform the method for sending a paging message.

According to a sixth aspect, an apparatus for receiving a paging message is provided, where the apparatus includes a second memory and a second processor, configured to perform the method for receiving a paging message.

According to a seventh aspect, a system for sending a paging message is provided, where the system includes the network side for sending a paging message and the second user equipment for receiving a paging message.

In embodiments of the present invention, a discontinuous reception period length of a first user equipment is less than a discontinuous reception period length of a second user equipment; therefore, sending paging messages through different paging channels or limiting a paging occasion for the second user equipment to a first time length mitigates impact of the second user equipment on the first user equipment; for change information of a system broadcast message, when the change information of the system broadcast message is sent to the first user equipment, selecting a paging channel different from that of the second user equipment or limiting the paging occasion for the second user equipment to the first time length reduces a time length for sending the change information of the system broadcast message to the first user equipment, and reduces extra electricity consumed by the first user equipment. A changed system broadcast message starts to be sent before all second user equipments are notified, which reduces a delay time for sending the changed system broadcast message.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Embodiment 1

Figure 1:
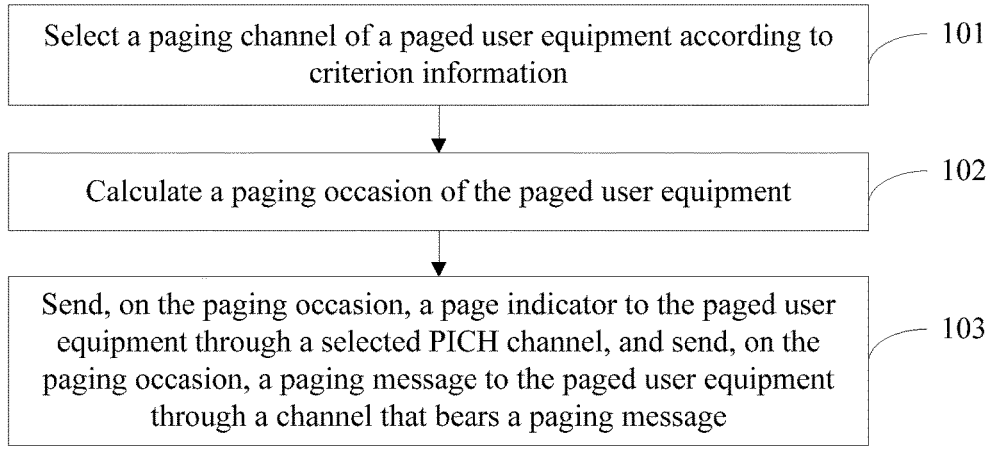
FIG. 1 is a flowchart of a method for sending a paging message according to Embodiment 1 of the present invention.

This embodiment of the present invention provides a method for sending a paging message. Referring to FIG. 1, the method includes the following steps:

Step 101: Select a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel.

Step 102: Calculate a paging occasion for the paged user equipment.

Step 103: Send, on the paging occasion, a page indicator to the paged user equipment through the selected PICH channel, and send, on the paging occasion, a paging message to the paged user equipment through the paging-message-bearer channel, where the paging message carries paging data.

This embodiment of the present invention may be executed by a network side, and specifically by an RNC (radio network controller) and/or a NodeB.

In this embodiment of the present invention, different paging channels are selected according to rule information, and paging messages are sent through the different paging channels in a paging occasion for a paged user equipment, which reduces a quantity of unnecessary paging messages received by user equipment, and reduces extra electricity consumed by the user equipment.

Embodiment 2

Figure 2:
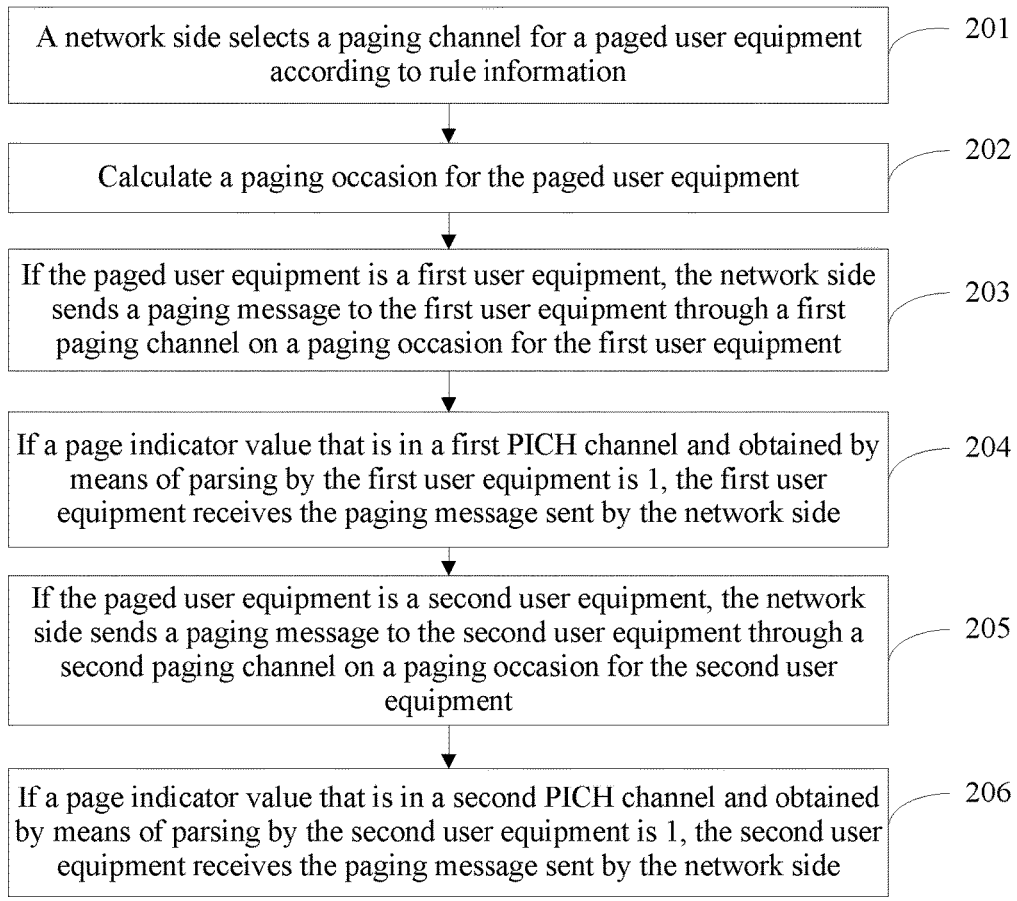
FIG. 2 is a flowchart of a method for sending a paging message according to Embodiment 2 of the present invention.

This embodiment of the present invention provides a method for sending a paging message. Referring to FIG. 2, the method includes the following steps:

Step 201: A network side selects a paging channel for a paged user equipment according to rule information, where the paging channel includes a PICH channel or includes a PICH channel and a paging-message-bearer channel, and the rule information includes a quantity of page indicator channels and further includes a preset threshold and/or a correspondence between a user equipment type and a paging channel.

Specifically, when the rule information includes the quantity of page indicator channels and the preset threshold, if the quantity of page indicator channels is greater than or equal to 2 and a discontinuous reception period length of the paged user equipment is less than or equal to the preset threshold, a first paging channel is selected; if the quantity of page indicator channels is greater than or equal to 2 and the discontinuous reception period length of the paged user equipment is greater than the preset threshold, a second paging channel is selected.

Optionally, when the rule information includes the quantity of page indicator channels and the correspondence between a user equipment type and a paging channel, a specific operation of the selecting, by a network side, a paging channel for a paged user equipment according to rule information may also be: if the quantity of page indicator channels is greater than or equal to 2, acquiring, according to a user equipment type of the paged user equipment, a corresponding paging channel from the correspondence between a user equipment type and a paging channel, that is, if the paged user equipment is a non-machine-type communications device, selecting the first paging channel; and if the paged user equipment is a machine-type communications device, selecting the second paging channel.

Optionally, when the rule information includes the quantity of page indicator channels, the preset threshold, and the correspondence between a user equipment type and a paging channel, a specific operation of the selecting, by a network side, a paging channel for a paged user equipment according to rule information may further be: if the quantity of page indicator channels is greater than or equal to 2 and the paged user equipment is a non-machine-type communications device, or the quantity of page indicator channels is greater than or equal to 2, the paged user equipment is a machine-type communications device, and the discontinuous reception period length of the paged user equipment is less than or equal to the preset threshold, selecting the first paging channel; and if the quantity of page indicator channels is greater than or equal to 2, the paged user equipment is a machine-type communications device, and the discontinuous reception period length of the paged user equipment is greater than the preset threshold, selecting the second paging channel.

If the discontinuous reception period length of the user equipment is equal to the preset threshold, the user equipment may also select the second paging channel, which is not limited herein.

A first user equipment is a user equipment that selects the first paging channel, a second user equipment is a user equipment that selects the second paging channel, the first paging channel includes at least a first PICH channel, and the second paging channel includes at least a second PICH channel.

The network side may allocate multiple paging channels to the first user equipment; after determining available paging channels according to a discontinuous reception period length of the user equipment and/or a device type of the user equipment, the user equipment then selects one first paging channel from the available paging channels. The network side may allocate multiple paging channels to the second user equipment; after determining available paging channels according to a discontinuous reception period length of the user equipment and/or a device type of the user equipment, the user equipment then selects one second paging channel from the available paging channels.

When the network side separately allocates multiple paging channels to the first user equipment and the second user equipment, the user equipments select paging channels according to identities of the user equipments and a quantity of paging channels. For example, the network side performs numbering on the multiple paging channels, the user equipment performs a modulo operation on the quantity of paging channels by using identity information of the user equipment, and uses a channel corresponding to a number the same as a result obtained by means of the modulo operation as a selected paging channel.

Further, the network side stores a non-machine-type and multiple selectable paging channels in the correspondence between a user equipment type and a paging channel, and stores a machine-type and multiple selectable paging channels in the correspondence between a user equipment type and a paging channel.

In this embodiment of the present invention, the network side may configure a same S-CCPCH (secondary common control physical channel) channel or different S-CCPCH channels for the first PICH channel and the second PICH channel; or the network side may configure different HS-PDSCH (high speed physical downlink shared channel) channels for the first PICH channel and the second PICH channel, where both the S-CCPCH channel and the HS-PDSCH channel may be configured to bear paging messages.

Further, the network side may send the discontinuous reception period length of the user equipment to the user equipment by using a system broadcast message.

Optionally, the preset threshold and/or the correspondence between a user equipment type and a paging channel may be agreed by the network side and the user equipment and therefore does not need to be included in a system broadcast message. Alternatively, the preset threshold and/or the correspondence between a user equipment type and a paging channel are/is sent to the user equipment by the network side by using dedicated RRC signaling.

Step 202: Calculate a paging occasion for the paged user equipment.

Specifically, the paging occasion for the paged user equipment is calculated according to an IMSI of the paged user equipment and the discontinuous reception period length of the paged user equipment and based on the following formula (1):

$$PO1=\{(IMSI/K)\%(DRXcl1/PBP)\}*PBP+n*DRXcl1+FO, \quad (1)$$

where n=0, 1, 2, . . . , m, and when n≤m, PO1≤4095.

m is a maximum value of n, and when n>m, PO1>4095.

In the foregoing formula (1), PO1 is the paging occasion for the paged user equipment, DRXcl1 is the discontinuous reception period length of the paged user equipment, K is a quantity of channels in a cell that bear paging messages, and % is a modulo operation; for a frequency division multiplexing system, PBP is 1, and FO is 0.

Further, for the first user equipment, K is a quantity of paging channels that are selectable by the first user equipment; for the second user equipment, K is a quantity of paging channels that are selectable by the second user equipment.

A maximum value of an SFN (System Frame Number, system frame number) is 4095.

In this embodiment of the present invention, the paging occasion for the paged user equipment may also be calculated according to the IMSI of the paged user equipment, a first time length, and the discontinuous reception period length of the paged user equipment and based on the following formula (2):

$$PO2=\{(IMSI/K)\%(DRXcln/PBP)\}*PBP+n*DRXcl2+FO, \quad (2)$$

where n=0, 1, 2, . . . , m, and when n≤m, PO2≤4095.

m is a maximum value of n, and when n>m, PO2>4095.

In the foregoing formula (2), PO2 is a paging occasion for the second user equipment, DRXcl2 is a discontinuous reception period length of the second user equipment, and DRXcln is the first time length.

Step 203: If the paged user equipment is first user equipment, the network side sends a paging message to the first user equipment through a first paging channel in a paging occasion for the first user equipment.

When paging data included in the paging message is change information of the system broadcast message, the network side continuously sends page indicators to the first user equipment through the first PICH channel within first duration, and sends, within the first duration, the change information of the system broadcast message to the first user equipment through the paging-message-bearer channel.

The first duration is a time length during which the network side sends the change information of the system broadcast message to the first user equipment.

Optionally, to allow all first user equipments that listen to the first PICH channel to receive the change information that is of the system broadcast message and sent by the network side, the network side sets a page indicator value in each first PICH channel to 1.

When the first duration ends, that is, when sending the change information of the system broadcast message for the first user equipment is completed, the network side may continuously send changed system broadcast messages, so that the first user equipment and the second user equipment receive the changed system broadcast messages. In this case, sending the change information of the system broadcast message for the second user equipment may still continue.

Step 204: If a page indicator value that is in a first PICH channel and obtained by means of parsing by the first user equipment is 1, the first user equipment receives the paging message sent by the network side.

Specifically, the first user equipment listens to the first PICH channel, parses the page indicator value according to a page indicator in the first PICH channel, determines that the page indicator value is 1, and receives the paging message sent by the network side.

The first user equipment may calculate the paging occasion for the first user equipment according to the IMSI of the first user equipment and the discontinuous reception period length of the first user equipment and based on the foregoing formula (1), and the first user equipment listens to the first PICH channel on the calculated paging occasion.

Optionally, the first user equipment may calculate the paging occasion for the first user equipment according to an IMSI (International Mobile Subscriber Identity, international mobile subscriber identity) of the first user equipment, the first time length, and the discontinuous reception period length of the first user equipment and based on the foregoing formula (2).

Step 205: If the paged user equipment is second user equipment, the network side sends a paging message to the second user equipment through a second paging channel in a paging occasion for the second user equipment.

When paging data included in the paging message is change information of the system broadcast message, the network side continuously sends page indicators to the second user equipment through the second PICH channel within second duration, and sends, within the second duration, the change information of the system broadcast message to the second user equipment through the paging-message-bearer channel.

The second duration is a total time length during which the network side sends the change information of the system broadcast message to the second user equipment, and the second duration is greater than or equal to the first duration.

Optionally, to allow all second user equipments that listen to the second PICH channel to receive the change information that is of the system broadcast message and sent by the network side, the network side sets a page indicator value in each second PICH channel to 1.

Step 206: If a page indicator value that is in a second PICH channel and obtained by means of parsing by the second user equipment is 1, the second user equipment receives the paging message sent by the network side.

Specifically, the second user equipment listens to the second PICH channel, parses the page indicator value according to a page indicator in the second PICH channel, determines that the page indicator value is 1, and receives the paging message sent by the network side.

The second user equipment may calculate the paging occasion for the second user equipment according to an IMSI of the second user equipment and the discontinuous reception period length of the second user equipment and based on the foregoing formula (1), and the second user equipment listens to the second PICH channel on the calculated paging occasion.

Optionally, the second user equipment may calculate the paging occasion for the second user equipment according to the IMSI of the second user equipment, the first time length, and the discontinuous reception period length of the second user equipment and based on the foregoing formula (2).

When the first user equipment and the second user equipment listen to a same PICH channel, if page indicator values that are listened to by multiple user equipments are all 1, the multiple user equipments each acquire paging messages sent by the network side. As a result, a user equipment that is not paged receives a paging message sent by the network side, which causes extra consumption of electricity. Therefore, in this embodiment of the present invention, the network side configures the first PICH channel for the first user equipment, and configures the second PICH channel for the second user equipment. When the network side pages the second user equipment, a quantity of extra paging messages that are sent by the network side for the second user equipment and acquired by the first user equipment is reduced, and extra electricity consumed by the first user equipment is further reduced.

Further, when the paging data is the change information of the system broadcast message, the second user equipment receives, according to the change information of the system broadcast message from the paging-message-bearer channel, a changed system broadcast message sent by the network side.

The change information of the system broadcast message includes a first SFN (System Frame Number, system frame number) and/or a change time point of the system broadcast message. The change time point of the system broadcast message is used to indicate exact time at which the system broadcast message changes, and a possible form is: hour/minute/second/millisecond; further, the change time point may further include a change date, and a possible form is: date/hour/minute/second/millisecond, or month/date/hour/minute/second/millisecond.

Specifically, if the change information of the system broadcast message received by the second user equipment is the change time point of the system broadcast message, a current time point is compared with the change time point of the system broadcast message; if the current time point is later than or equal to the change time point of the system broadcast message, the changed system broadcast message sent by the network side is received; if the current time point is earlier than the change time point of the system broadcast message, waiting continues and the changed system broadcast message sent by the network side is received at the change time point of the system broadcast message.

For example, the change time point included in the system broadcast message is: 06:10:03:012, and a time point at which the change information is received by the second user equipment is: 06:10:03:200; because 06:10:03:200 is later than 06:10:03:012, the second user equipment receives, after acquiring the change information, the changed system broadcast message sent by the network side; if a time point at which the change information is received by the second user equipment is: 06:10:03:000, the second user equipment determines, when receiving the change information, that the changed system broadcast message has not been sent, and the second user equipment reads the changed system broadcast message at 06:10:03:000.

Optionally, after the second user equipment receives the change information that is of the system broadcast message and sent by the network side, the second user equipment acquires a MIB (Master Information Block, master information block) in the system broadcast message, and compares the acquired MIB with a MIB stored in the second user equipment; if the acquired MIB and the MIB stored in the second user equipment are different, receives the changed system broadcast message sent by the network side; and if the acquired MIB and the MIB stored in the second user equipment are the same, does not receive the changed system broadcast message until a moment at which the system broadcast message changes.

Optionally, if the change information of the system broadcast message is the first SFN, after the second user equipment receives the change information that is of the system broadcast message and sent by the network side, the second user equipment acquires a second SFN at which the change information of the system broadcast message is received, and compares the first SFN with the second SFN; if the first SFN is greater than or equal to the second SFN, receives, according to scheduling information at the first SFN, the changed system broadcast message sent by the network side; and if the first SFN is less than the second SFN, receives, at a first SFN included in a next SFN period, the changed system broadcast message sent by the network side, where a master information block MIB of the system broadcast message or a scheduling block of the system broadcast message includes the scheduling information.

Further, the second user equipment needs to send uplink data to the network side when the first SFN has not arrived, that is, when a third SFN corresponding to a current time point does not reach the first SFN, the second user equipment needs to send the uplink data to the network side; then, the second user equipment acquires the MIB of the system broadcast message; if the acquired MIB and a MIB that has been stored are different, the second user equipment determines that the system broadcast message changes, and acquires the changed system broadcast message, so as to ensure that a system broadcast message stored by the second user equipment before the uplink data is sent is a latest system broadcast message.

Further, the second user equipment may not only acquire, according to the foregoing steps, the changed system broadcast message sent by the network side, but also may acquire, according to the following steps, the changed system broadcast message sent by the network side, where the steps include:

when the second user equipment listens to a PICH channel, ignoring, by the second user equipment, the change information of the system broadcast message; acquiring, by the second user equipment, a MIB from the network side, and comparing the acquired MIB and a MIB stored in the second user equipment, only before the second user equipment sends the uplink data to the network side; and if the acquired MIB and the MIB stored in the second user equipment are different, determining that the system broadcast message changes, and acquiring the changed system broadcast message.

If the acquired MIB and the MIB stored in the second user equipment are the same, it is determined that the system broadcast message does not change.

Further, before the second user equipment sends the uplink data to the network side, the second user equipment may also acquire all system broadcast messages from the network side.

In this embodiment of the present invention, a first PICH channel is configured for first user equipment, and a second PICH channel is configured for a second user equipment; paging the second user equipment by a network side does not lead to impact on the first user equipment, which avoids extra electricity consumed by the first user equipment. For change information of a system broadcast message, the change information of the system broadcast message is sent to the first user equipment within first duration, and a changed system broadcast message starts to be sent before all second user equipments are notified, which reduces a delay time for sending the changed system broadcast message.

Embodiment 3

Figure 3:
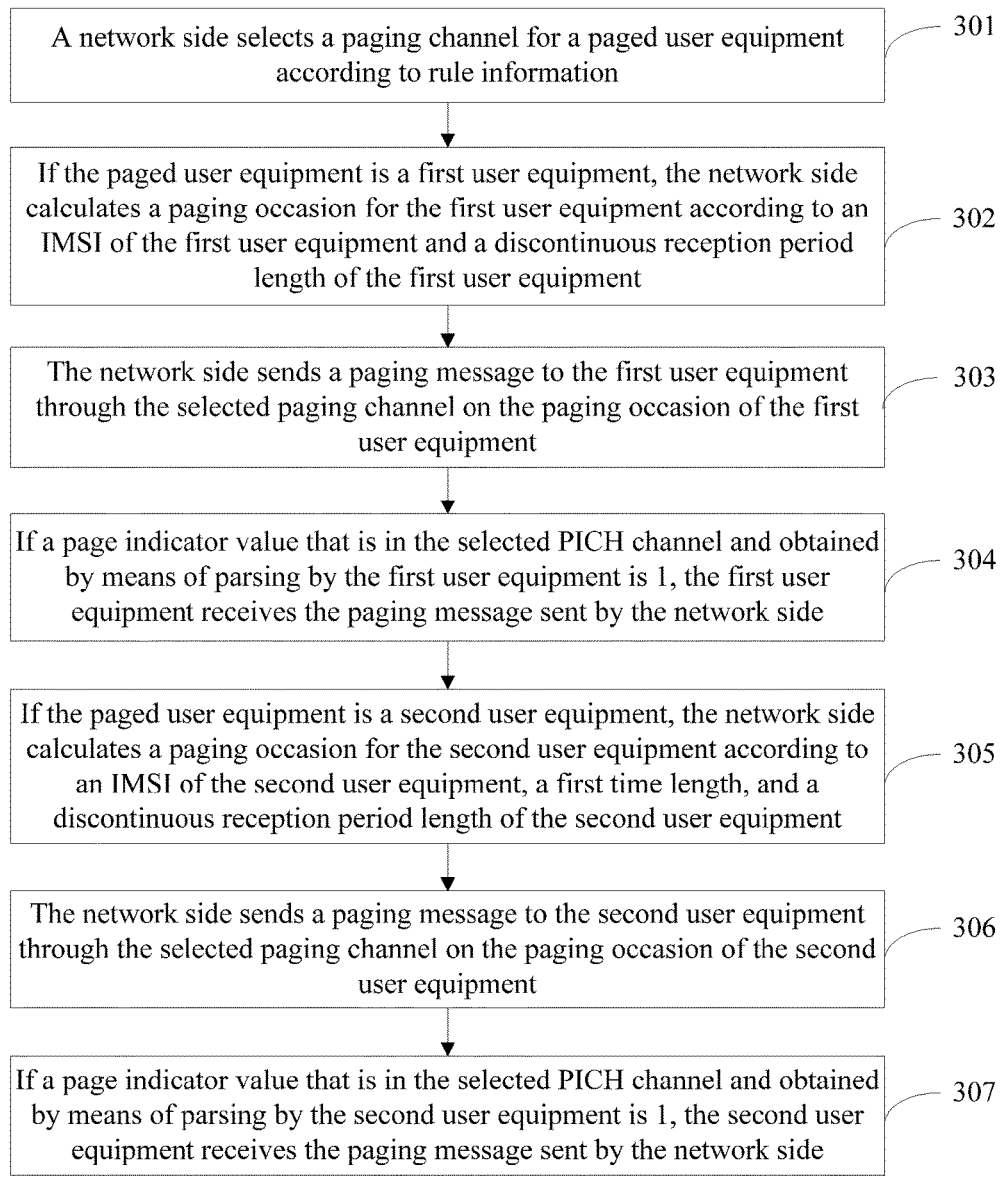
FIG. 3 is a flowchart of a method for sending a paging message according to Embodiment 3 of the present invention.

This embodiment of the present invention provides a method for sending a paging message. Referring to FIG. 3, the method includes the following steps:

Step 301: A network side selects a paging channel for a paged user equipment according to rule information, where the paging channel includes a PICH channel or includes a PICH channel and a paging-message-bearer channel, and the rule information includes a quantity of page indicator channels and further includes a preset threshold and/or a correspondence between a user equipment type and a paging channel.

In this embodiment of the present invention, the network side may configure multiple same paging channels, that is, multiple same PICH channels and multiple same channels that bear paging messages, for a first user equipment and a second user equipment, and the first user equipment and the second user equipment select paging channels according to identities of the first user equipment and the second user equipment and a quantity of paging channels. For example, the network side performs numbering on the multiple paging channels, the user equipment performs a modulo operation on the quantity of paging channels by using identity information of the user equipment, and uses a channel corresponding to a number the same as a result obtained by means of the modulo operation as a selected paging channel.

A user equipment is determined as the first user equipment when the user equipment meets any one of the following three conditions: Condition 1: a discontinuous reception period length of the user equipment is less than or equal to the preset threshold; condition 2: the user equipment is a non-machine-type communications device; condition 3: the user equipment is a machine-type communications device and the discontinuous reception period length of the user equipment is less than or equal to the preset threshold. When the discontinuous reception period length of the user equipment is greater than the preset threshold and/or the user equipment is a machine-type communications device, the user equipment is determined as the second user equipment.

Further, when a quantity of page indicator channels in this embodiment of the present invention is 1, the network side may directly determine a configured PICH channel and a configured paging-message-bearer channel as paging channels for the paged user equipment.

Step 302: If the paged user equipment is first user equipment, the network side calculates a paging occasion for the first user equipment according to an IMSI of the first user equipment and a discontinuous reception period length of the first user equipment.

Specifically, if the paged user equipment is the first user equipment, the network side calculates the paging occasion for the first user equipment according to the IMSI of the first user equipment and the discontinuous reception period length of the first user equipment and based on the following formula (1):

$$PO1=\{(IMSI/K)\%(DRXcl1/PBP)\}*PBP+n*DRXcl1+FO, \quad (1)$$

where n=0, 1, 2, . . . , m, and when n≤m, PO1≥4095.

m is a maximum value of n, and when n>m, PO1>4095.

In the foregoing formula (1), PO1 is the paging occasion for the first user equipment, DRXcl1 is the discontinuous reception period length of the first user equipment, K is a quantity of channels in a cell that bear paging messages, and % is a modulo operation; for a frequency division multiplexing system, PBP is 1, and FO is 0.

Step 303: The network side sends a paging message to the first user equipment through the selected paging channel on the paging occasion of the first user equipment.

When paging data included in the paging message is change information of a system broadcast message, the network side sends a page indicator to the first user equipment through the selected PICH channel within first duration, and sends, within the first duration, the change information of the system broadcast message to the first user equipment through the paging-message-bearer channel.

The first duration is a total time length during which the network side sends the change information of the system broadcast message to the first user equipment.

Optionally, to allow all first user equipments that listen to the selected PICH channel to receive the change information that is of the system broadcast message and sent by the network side, the network side sets a page indicator value in each selected PICH channel to 1.

When the first duration ends, that is, when sending the change information of the system broadcast message for the first user equipment is completed, the network side may continuously send changed system broadcast messages, so that the first user equipment and the second user equipment receive the changed system broadcast messages. In this case, sending the change information of the system broadcast message for the second user equipment may still continue.

Step 304: If a page indicator value that is in the selected PICH channel and obtained by means of parsing by the first user equipment is 1, the first user equipment receives the paging message sent by the network side.

Specifically, the first user equipment listens to the selected PICH channel, parses the page indicator value according to a page indicator in the selected PICH channel, determines that the page indicator value is 1, and receives the paging message sent by the network side.

The first user equipment may calculate the paging occasion for the first user equipment according to the IMSI of the first user equipment and the discontinuous reception period length of the first user equipment and based on the foregoing formula (1), and the first user equipment listens to the selected PICH channel on the calculated paging occasion.

Step 305: If the paged user equipment is a second user equipment, the network side calculates a paging occasion for the second user equipment according to an IMSI of the second user equipment, a first time length, and a discontinuous reception period length of the second user equipment.

Specifically, if the paged user equipment is the second user equipment, the network side calculates the paging occasion for the second user equipment according to the IMSI of the second user equipment, the first time length, and the discontinuous reception period length of the second user equipment and based on the following formula (2):

$$PO2=\{(IMSI/K)\%(DRXcln/PBP)\}*PBP+n*DRXcl2+FO, \quad (2)$$

where $n=0, 1, 2, \ldots, m$, and when $n \leq m$, $PO2 \leq 4095$.

m is a maximum value of n, and when $n > m$, $PO2 > 4095$.

In the foregoing formula (2), PO2 is the paging occasion for the second user equipment, DRXcl2 is the discontinuous reception period length of the second user equipment, and DRXcln is the first time length.

A maximum value of an SFN is 4095.

Further, the first time length is sent to a UE by the network side by using a system broadcast message or by using dedicated RRC (radio resource control) signaling. There is a first time length in each period, and a paging occasion for the second user equipment within any period is included in a first time length in the period.

The network side pages the first user equipment on the paging occasion of the first user equipment, and pages the second user equipment on the paging occasion of the second user equipment; the first user equipment listens to a PICH channel on the paging occasion of the first user equipment, and the second user equipment listens to a PICH channel on the paging occasion of the second user equipment.

The network side may send the discontinuous reception period length of the user equipment of the cell to the user equipment of the cell by using a system broadcast message.

Step 306: The network side sends a paging message to the second user equipment through the selected paging channel on the paging occasion of the second user equipment.

When paging data included in the paging message is change information of a system broadcast message, the network side continuously sends page indicators to the second user equipment through the selected PICH channel within the first time length, and sends, within the first time length, the change information of the system broadcast message to the second user equipment through the paging-message-bearer channel.

Optionally, to allow all second user equipments that listen to the selected PICH channel to receive the change information that is of the system broadcast message and sent by the network side, the network side sets a page indicator value in a PICH channel selected by each second user equipment to 1.

Step 307: If a page indicator value that is in the selected PICH channel and obtained by means of parsing by the second user equipment is 1, the second user equipment receives the paging message sent by the network side.

Specifically, the second user equipment listens to the selected PICH channel, parses the page indicator value according to a page indicator in the selected PICH channel, determines that the page indicator value is 1, and receives the paging message sent by the network side.

The second user equipment may calculate the paging occasion for the second user equipment according to the IMSI of the second user equipment, the first time length, and the discontinuous reception period length of the second user equipment and based on the foregoing formula (2), and the second user equipment listens to the selected PICH channel on the calculated paging occasion.

Because the first time length is less than a greatest discontinuous reception period length of the second user equipment, when the network side pages the second user equipment within the first time length, a time length for paging the second user equipment is shortened, which mitigates impact of paging the second user equipment on the first user equipment, further reduces a quantity of paging messages that are sent by the network side and acquired by the first user equipment in excess, and further reduces extra electricity consumed by the first user equipment.

Further, when the paging data is the change information of the system broadcast message, the second user equipment receives, according to the change information of the system broadcast message from the paging-message-bearer channel, a changed system broadcast message sent by the network side.

The change information of the system broadcast message includes a first SFN and/or a change time point of the system broadcast message. The change time point of the system broadcast message is used to indicate exact time at which the system broadcast message changes, and a possible form is: hour/minute/second/millisecond; further, the change time point may further include a change date, and a possible form is: date/hour/minute/second/millisecond, or month/date/hour/minute/second/millisecond.

Specifically, if the change information that is of the system broadcast message and received by the second user equipment is the change time point of the system broadcast message, a current time point is compared with the change time point of the system broadcast message; if the current time point is later than or equal to the change time point of the system broadcast message, the changed system broadcast message sent by the network side is received; otherwise, waiting continues and the changed system broadcast message sent by the network side is received at the change time point of the system broadcast message.

For example, the change time point included in the system broadcast message is: 06:10:03:012, and a time point at which the change information is received by the UE is: 06:10:03:200; because 06:10:03:200 is later than 06:10:03:012, the UE receives, after acquiring the change information, the changed system broadcast message sent by the network side; if a time point at which the change information is received by the UE is: 06:10:03:000, the UE determines, when receiving the change information, that the changed system broadcast message has not been sent, and the UE reads the changed system broadcast message at 06:10:03:000.

Optionally, after the second user equipment receives the change information that is of the system broadcast message and sent by the network side, the second user equipment acquires a MIB in the system broadcast message, and compares the acquired MIB with a MIB stored in the second user equipment; if the acquired MIB and the MIB stored in the second user equipment are different, receives the changed system broadcast message sent by the network side; and if the acquired MIB and the MIB stored in the second user equipment are the same, does not receive the changed system broadcast message until a moment at which the system broadcast message changes.

Optionally, if the change information of the system broadcast message is the first SFN, after the second user equipment receives the change information that is of the system broadcast message and sent by the network side, the second user equipment acquires a second SFN at which the change information of the system broadcast message is received, and compares the first SFN with the second SFN; if the first SFN is greater than or equal to the second SFN, receives, according to scheduling information at the first SFN, the changed system broadcast message sent by the network side; and if the first SFN is less than the second SFN, receives, at a first SFN included in a next SFN period, the changed system broadcast message sent by the network side, where a master information block MIB of the system broadcast message or a scheduling block of the system broadcast message includes the scheduling information.

In this embodiment of the present invention, the second user equipment always determines that an SFN included in the change information of the received system broadcast message is a next SFN that is closest to a current SFN. For example, an SFN at which the second user equipment receives the change information of the system broadcast message is 1022, that is, the second SFN is 1022, and an SFN included in the change information of the system broadcast message is 1010, that is, the first SFN is 1010. Because 1010 is less than 1022, the second user equipment reads a changed system broadcast message when a next 1010 arrives. Because an SFN periodically and progressively increases, after 4095, the SFN is counted from 0 again, 0 to 4095 is an SFN period, and the next 1010 and a current 1022 belong to different SFN periods; if an SFN at which the second user equipment receives the change information of the system broadcast message is 1008, that is, if the second SFN is 1008, because 1010 is greater than 1008, the changed system broadcast message is read when the SFN is 1010.

Further, the second user equipment needs to send uplink data to the network side when the first SFN has not arrived, that is, when a third SFN corresponding to a current time point does not reach the first SFN, the second user equipment needs to send the uplink data to the network side; then, the second user equipment acquires the MIB of the system broadcast message; if the acquired MIB and a MIB that has been stored are different, the second user equipment determines that the system broadcast message changes, and acquires the changed system broadcast message, so as to ensure that a system broadcast message stored by the second user equipment before the uplink data is sent is a latest system broadcast message.

Further, the second user equipment may not only acquire, according to the foregoing steps, the changed system broadcast message sent by the network side, but also may acquire, according to the following steps, the changed system broadcast message sent by the network side, where the steps include:

when the second user equipment listens to a PICH channel, ignoring, by the second user equipment, the change information of the system broadcast message; acquiring, by the second user equipment, a MIB from the network side, and comparing the acquired MIB and a MIB stored in the second user equipment, only before the second user equipment sends the uplink data to the network side; and if the acquired MIB and the MIB stored in the second user equipment are different, determining that the system broadcast message changes, and acquiring the changed system broadcast message.

If the acquired MIB and the MIB stored in the second user equipment are the same, it is determined that the system broadcast message does not change.

Further, before the second user equipment sends the uplink data to the network side, the second user equipment may also acquire all system broadcast messages from the network side.

In this embodiment of the present invention, because a first time length is less than a greatest discontinuous reception period length of a second user equipment, when a network side pages the second user equipment within the first time length, a time length for paging the second user equipment is shortened, which reduces a quantity of paging messages that are sent by the network side and acquired by first user equipment in excess, and further reduces extra electricity consumed by the first user equipment. The change information of the system broadcast message is sent to the first user equipment within first duration, which reduces a time length for sending change information of a system broadcast message to the first user equipment, and reduces extra electricity consumed by a UE whose discontinuous reception period length is relatively small. A changed system broadcast message starts to be sent after the first duration, so that the first user equipment receives the changed system broadcast message, which reduces a delay time for receiving the changed system broadcast message by the first user equipment.

Embodiment 4

Figure 4:
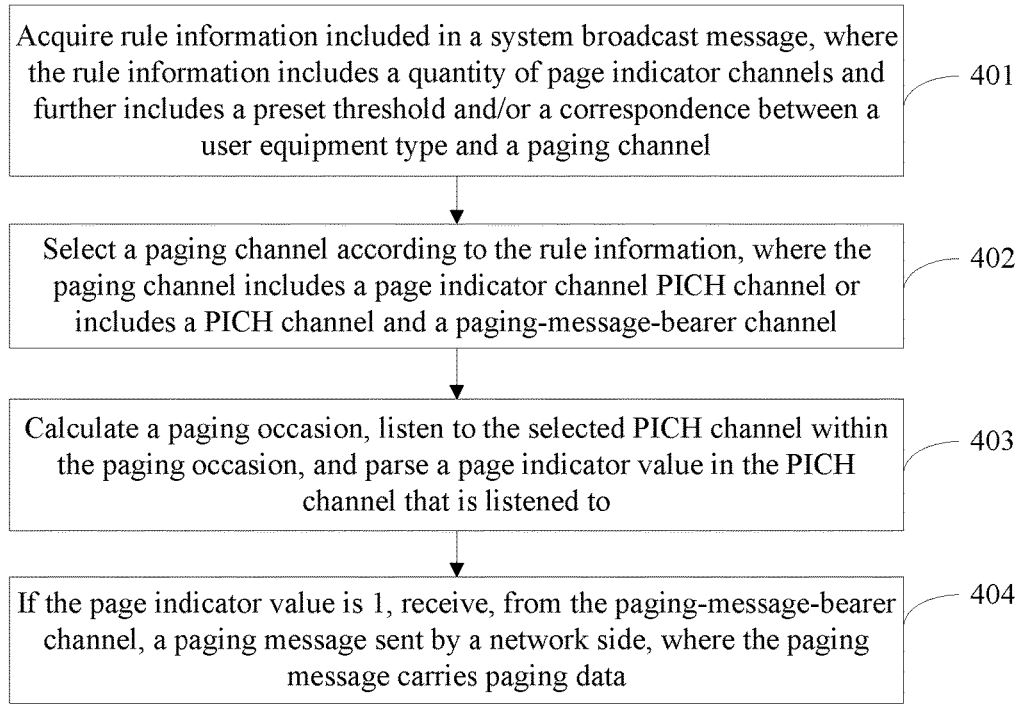
FIG. 4 is a flowchart of a method for receiving a paging message according to Embodiment 4 of the present invention.

This embodiment of the present invention provides a method for receiving a paging message. Referring to FIG. 4, the method includes the following steps:

Step 401: Acquire rule information included in a system broadcast message, where the rule information includes a quantity of page indicator channels and further includes a preset threshold and/or a correspondence between a user equipment type and a paging channel.

Step 402: Select a paging channel according to the rule information, where the paging channel includes a page indicator channel PICH channel or includes a PICH channel and a paging-message-bearer channel.

Step 403: Calculate a paging occasion, listen to the selected PICH channel within the paging occasion, and parse a page indicator value in the PICH channel that is listened to.

Step 404: If the page indicator value is 1, receive, from the paging-message-bearer channel, a paging message sent by a network side, where the paging message carries paging data.

The selecting a paging channel according to the rule information includes:

if the quantity of page indicator channels is greater than or equal to 2, acquiring, according to a user equipment type of paged user equipment, a corresponding paging channel from the correspondence between a user equipment type and a paging channel.

The selecting a paging channel according to the rule information includes:

if a discontinuous reception period length of a user equipment is greater than the preset threshold, selecting a second paging channel.

Selecting the paging channel according to the user equipment type of the paged user equipment and the discontinuous reception period length of the paged user equipment includes:

if the user equipment is a non-machine-type communications device, or the user equipment is a machine-type communications device and the discontinuous reception period length of the paged user equipment is less than or equal to the preset threshold, selecting a first paging channel; if the user equipment is a machine-type communications device and the discontinuous reception period length of the paged user equipment is greater than the preset threshold, selecting the second paging channel.

If the discontinuous reception period length of the user equipment is equal to the preset threshold, the user equipment may also select the second paging channel, which is not limited herein.

The selecting the paging channel for the paged user equipment according to the rule information includes:

selecting, by the user equipment, the paging channel according to identity information of the user equipment and a quantity of paging channels. For example, the user equipment performs a modulo operation on the quantity of paging channels according to the identity information of the user equipment, and uses a channel corresponding to a number the same as a result obtained by means of the modulo operation as a selected paging channel. The network side performs numbering on multiple paging channels that are selectable by the user equipment.

Further, after the user equipment selects a paging channel, if the discontinuous reception period length of the paged user equipment is greater than the preset threshold, the selected paging channel is referred to as the second paging channel; or if the paged user equipment is a machine-type communications device, the selected paging channel is referred to as the second paging channel; or if the paged user equipment is a machine-type communications device and the discontinuous reception period length of the paged user equipment is greater than the preset threshold, the selected paging channel is referred to as the second paging channel. The paging channel selected by the user equipment for which the foregoing condition is not met is referred to as the first paging channel.

Optionally, the foregoing first paging channel and second paging channel are distinguished according to a difference of user equipments. The first paging channel and the second paging channel may be a same channel, or may be different channels, which depends on a calculation result obtained by performing a modulo operation on the quantity of paging channels according to an identity of user equipment.

The calculating a paging occasion includes:

calculating the paging occasion according to an international mobile subscriber identity IMSI, a first time length, and a discontinuous reception period length of the paged user equipment.

Further, the method further includes:

acquiring, from the system broadcast message, the discontinuous reception period length of the paged user equipment and/or the first time length.

When the paging data is change information of the system broadcast message, after the receiving, from the paging-message-bearer channel, a paging message sent by a network side, the method further includes:

receiving, according to the change information of the system broadcast message, a changed system broadcast message sent by the network side, where the change information of the system broadcast message includes a first system frame number SFN and/or a change time point of the system broadcast message.

The receiving, according to the change information of the system broadcast message, a changed system broadcast message sent by the network side includes:

comparing a current time point with the change time point included in the change information of the system broadcast message;

if the current time point is later than or equal to the change time point of the system broadcast message, receiving the changed system broadcast message sent by the network side; and if the current time point is earlier than the change time point of the system broadcast message, continuing waiting and receiving, at the change time point of the system broadcast message, the changed system broadcast message sent by the network side.

Optionally, the receiving, according to the change information of the system broadcast message, a changed system broadcast message sent by the network side includes:

acquiring a second SFN at which the change information of the system broadcast message is received;

if the first SFN is greater than or equal to the second SFN, receiving, at the first SFN according to scheduling information, the changed system broadcast message sent by the network side, where a master information block MIB of the system broadcast message or a scheduling block of the system broadcast message includes the scheduling information; and if the first SFN is less than the second SFN, receiving, according to the scheduling information at a first SFN included in a next SFN period, the changed system broadcast message sent by the network side.

Further, the method further includes:

if a third SFN corresponding to a current time point does not reach the first SFN and uplink data needs to be sent, acquiring the MIB of the system broadcast message; and if the acquired MIB is different from a MIB that has been stored, determining that the system broadcast message changes, and acquiring the changed system broadcast message.

Optionally, the receiving, according to the change information of the system broadcast message, a changed system broadcast message sent by the network side includes:

after receiving the change information of the system broadcast message, acquiring a MIB of the system broadcast message; and if the acquired MIB is different from a MIB that has been stored, receiving the changed system broadcast message sent by the network side.

This embodiment of the present invention may be executed by second user equipment.

In this embodiment of the present invention, a paging occasion for a second user equipment is calculated by using a first time length, so that occasions for paging the second user equipment by a network side are concentrated within the first time length, which mitigates impact on paging first user equipment; for sending a paging message for a change of a system broadcast message, a time length for sending change information of the system broadcast message to the first user equipment is reduced, and extra electricity consumed by a UE whose discontinuous reception period length is relatively small is reduced. The network side may send the change information of the system broadcast message before the second user equipment is notified, which reduces a delay time for receiving the changed system broadcast message by the first user equipment.

Embodiment 5

Figure 5:
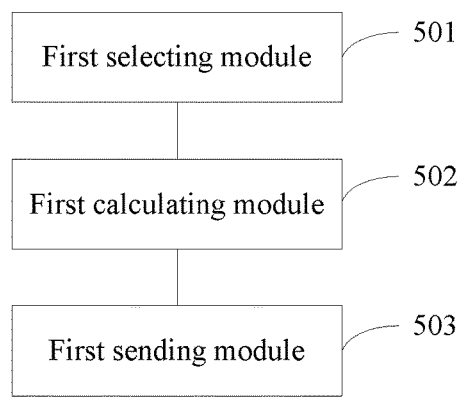
FIG. 5 is a schematic structural diagram of an apparatus for sending a paging message according to Embodiment 5 of the present invention.

This embodiment of the present invention provides an apparatus for sending a paging message. Referring to FIG. 5, the apparatus includes:

a first selecting module 501, configured to select a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel;

a first calculating module 502, configured to calculate a paging occasion for the paged user equipment; and a first sending module 503, configured to send, on the paging occasion, a page indicator to the paged user equipment through the selected PICH channel, and send, on the paging occasion, a paging message to the paged user equipment through the paging-message-bearer channel, where the paging message carries paging data.

The first selecting module 501 includes:

a first selecting unit, configured to: if the quantity of page indicator channels is greater than or equal to 2 and a discontinuous reception period length of the paged user equipment is less than or equal to the preset threshold, select a first paging channel; and a second selecting unit, configured to: if the quantity of page indicator channels is greater than or equal to 2 and the discontinuous reception period length of the paged user equipment is greater than the preset threshold, select a second paging channel.

The first selecting module 501 includes:

a first acquiring unit, configured to: if the quantity of page indicator channels is greater than or equal to 2, acquire, according to a user equipment type of the paged user equipment, a corresponding paging channel from the correspondence between a user equipment type and a paging channel.

The first acquiring unit includes:

a first selecting subunit, configured to: if the paged user equipment is a non-machine-type communications device, select the first paging channel; and a second selecting subunit, configured to: if the paged user equipment is a machine-type communications device, select the second paging channel.

The first calculating module 502 is specifically configured to: if the discontinuous reception period length of the paged user equipment is greater than the preset threshold and/or the paged user equipment is a machine-type communications device, calculate the paging occasion for the paged user equipment according to an international mobile subscriber identity IMSI of the paged user equipment, a first time length, and the discontinuous reception period length of the paged user equipment.

When the paging data is change information of a system broadcast message, the paged user equipment includes first user equipment and second user equipment, where the first user equipment is a user equipment that selects the first paging channel, and the second user equipment is a user equipment that selects the second paging channel.

The first sending module 503 includes:

a first sending unit, configured to send a page indicator to the first user equipment through a first PICH channel, and send the change information of the system broadcast message to the first user equipment through the paging-message-bearer channel; and a second sending unit, configured to send a page indicator to the second user equipment through a second PICH channel, and send the change information of the system broadcast message to the second user equipment through the paging-message-bearer channel.

The change information of the system broadcast message includes a first system frame number SFN and/or a change time point of the system broadcast message.

The apparatus further includes:

a second sending module, configured to send the first time length and/or the preset threshold to a user equipment of a cell; or a third sending module, configured to send the first time length and/or the correspondence between a user equipment type and a paging channel to the user equipment of the cell.

In this embodiment of the present invention, a discontinuous reception period length of a first user equipment is less than a discontinuous reception period length of a second user equipment; therefore, sending paging messages through different paging channels or limiting a paging occasion for the second user equipment to a first time length mitigates impact of the second user equipment corresponding to the first user equipment; for change information of a system broadcast message, when the change information of the system broadcast message is sent to the first user equipment, selecting a paging channel different from that of the second user equipment or limiting the paging occasion for the second user equipment to the first time length reduces a time length for sending the change information of the system broadcast message to the first user equipment, and reduces extra electricity consumed by the first user equipment. A changed system broadcast message starts to be sent before all second user equipments are notified, which reduces a delay time for sending the changed system broadcast message.

Embodiment 6

Figure 6:
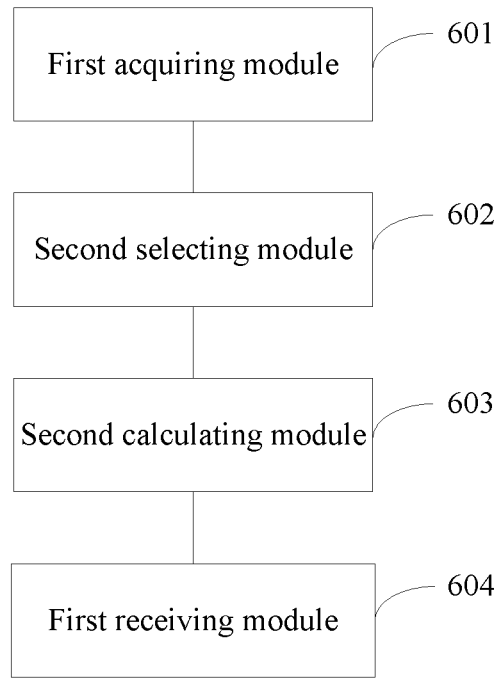
FIG. 6 is a schematic structural diagram of an apparatus for receiving a paging message according to Embodiment 6 of the present invention.

This embodiment of the present invention provides an apparatus for receiving a paging message. Referring to FIG. 6, the apparatus includes:

a first acquiring module 601, configured to acquire rule information included in a system broadcast message, where the rule information includes a quantity of page indicator channels and further includes a preset threshold and/or a correspondence between a user equipment type and a paging channel;

a second selecting module 602, configured to select a paging channel according to the rule information, where the paging channel includes a page indicator channel PICH channel or includes a PICH channel and a paging-message-bearer channel;

a second calculating module 603, configured to calculate a paging occasion, listen to the selected PICH channel within the paging occasion, and parse a page indicator value in the PICH channel that is listened to; and a first receiving module 604, configured to: if the page indicator value is 1, receive, from the paging-message-bearer channel, a paging message sent by a network side, where the paging message carries paging data.

The second selecting module 602 includes:

a second acquiring unit, configured to: if the quantity of page indicator channels is greater than or equal to 2, acquire, according to a user equipment type of the paged user equipment, a corresponding paging channel from the correspondence between a user equipment type and a paging channel.

The second selecting module 602 includes:

a third selecting unit, configured to: if a discontinuous reception period length of a user equipment is greater than the preset threshold, select a second paging channel.

The second calculating module 603 includes:

a calculating unit, configured to calculate the paging occasion according to an international mobile subscriber identity IMSI, a first time length, and a discontinuous reception period length of paged user equipment.

Further, the apparatus further includes:

a second acquiring module, configured to acquire, from the system broadcast message, the discontinuous reception period length of the paged user equipment and/or the first time length.

When the paging data is change information of the system broadcast message, the apparatus further includes:

a second receiving module, configured to receive, according to the change information of the system broadcast message, a changed system broadcast message sent by the network side, where the change information of the system broadcast message includes a first system frame number SFN and/or a change time point of the system broadcast message.

The second receiving module includes:

a comparing unit, configured to compare a current time point with the change time point included in the change information of the system broadcast message;

a first receiving unit, configured to: if the current time point is later than or equal to the change time point of the system broadcast message, receive the changed system broadcast message sent by the network side; and a second receiving unit, configured to: if the current time point is earlier than the change time point of the system broadcast message, continue waiting and receive, at the change time point of the system broadcast message, the changed system broadcast message sent by the network side.

Optionally, the second receiving module includes:

a third acquiring unit, configured to acquire a second SFN at which the change information of the system broadcast message is received;

a third receiving unit, configured to: if the first SFN is greater than or equal to the second SFN, receive, at the first SFN according to scheduling information, the changed system broadcast message sent by the network side, where a master information block MIB of the system broadcast message or a scheduling block of the system broadcast message includes the scheduling information; and a fourth receiving unit, configured to: if the first SFN is less than the second SFN, receive, according to the scheduling information at a first SFN included in a next SFN period, the changed system broadcast message sent by the network side.

Further, the apparatus further includes:

a third acquiring module, configured to: if a third SFN corresponding to a current time point does not reach the first SFN and uplink data needs to be sent, acquire the MIB of the system broadcast message; and a fourth acquiring module, configured to: if the acquired MIB is different from a MIB that has been stored, determine that the system broadcast message changes, and acquire the changed system broadcast message.

Optionally, the second receiving module includes:

a fifth receiving unit, configured to: after receiving the change information of the system broadcast message, acquire a MIB of the system broadcast message; and a sixth receiving unit, configured to: if the acquired MIB is different from a MIB that has been stored, receive the changed system broadcast message sent by the network side.

In this embodiment of the present invention, a paging occasion for a second user equipment is calculated by using a first time length, so that occasions for paging the second user equipment by a network side are concentrated within the first time length, which mitigates impact on paging first user equipment; for sending a paging message for a change of a system broadcast message, a time length for sending change information of the system broadcast message to the first user equipment is reduced, and extra electricity consumed by a UE whose discontinuous reception period length is relatively small is reduced. The network side may send the change information of the system broadcast message before the second user equipment is notified, which reduces a delay time for receiving the changed system broadcast message by the first user equipment.

Embodiment 7

Figure 7:
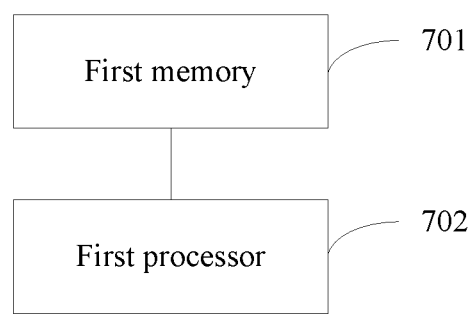
FIG. 7 is a schematic structural diagram of another apparatus for sending a paging message according to Embodiment 7 of the present invention.

This embodiment of the present invention provides an apparatus for sending a paging message. Referring to FIG. 7, the apparatus includes a first memory 701 and a first processor 702, configured to perform the following method for sending a paging message:

selecting a paging channel for a paged user equipment according to rule information, where the paging channel includes a page indicator channel PICH channel or includes a PICH channel and a paging-message-bearer channel, and the rule information includes a quantity of page indicator channels and further includes a preset threshold and/or a correspondence between a user equipment type and a paging channel;

calculating a paging occasion for the paged user equipment; and on the paging occasion, sending a page indicator to the paged user equipment through the selected PICH channel and sending a paging message to the paged user equipment through the paging-message-bearer channel, where the paging message carries paging data.

The selecting a paging channel for a paged user equipment according to rule information includes:

if the quantity of page indicator channels is greater than or equal to 2 and a discontinuous reception period length of the paged user equipment is less than or equal to the preset threshold, selecting a first paging channel; and if the quantity of page indicator channels is greater than or equal to 2 and the discontinuous reception period length of the paged user equipment is greater than the preset threshold, selecting a second paging channel.

The selecting a paging channel for a paged user equipment according to rule information includes:

if the quantity of page indicator channels is greater than or equal to 2, acquiring, according to a user equipment type of the paged user equipment, a corresponding paging channel from the correspondence between a user equipment type and a paging channel.

Further, the acquiring, according to a user equipment type of the paged user equipment, a corresponding paging channel from the correspondence between a user equipment type and a paging channel includes:

if the paged user equipment is a non-machine-type communications device, selecting the first paging channel; and if the paged user equipment is a machine-type communications device, selecting the second paging channel.

The calculating a paging occasion for the paged user equipment includes:

if a discontinuous reception period length of the paged user equipment is greater than the preset threshold and/or the paged user equipment is a machine-type communications device, calculating the paging occasion for the paged user equipment according to an international mobile subscriber identity IMSI of the paged user equipment, a first time length, and the discontinuous reception period length of the paged user equipment.

When the paging data is change information of a system broadcast message, the paged user equipment includes first user equipment and second user equipment, where the first user equipment is a user equipment that selects the first paging channel, and the second user equipment is a user equipment that selects the second paging channel.

The, on the paging occasion, sending a page indicator to the paged user equipment through the selected PICH channel and sending a paging message to the paged user equipment through the paging-message-bearer channel includes:

sending a page indicator to the first user equipment through a first PICH channel, and sending the change information of the system broadcast message to the first user equipment through the paging-message-bearer channel; and sending a page indicator to the second user equipment through a second PICH channel, and sending the change information of the system broadcast message to the second user equipment through the paging-message-bearer channel.

The change information of the system broadcast message includes a first system frame number SFN and/or a change time point of the system broadcast message.

Further, before the, on the paging occasion, sending a page indicator to the paged user equipment through the selected PICH channel and sending a paging message to the paged user equipment through the paging-message-bearer channel, the method further includes:

sending the first time length and/or the preset threshold to a user equipment of a cell; or sending the first time length and/or the correspondence between a user equipment type and a paging channel to the user equipment of the cell.

In this embodiment of the present invention, a discontinuous reception period length of a first user equipment is less than a discontinuous reception period length of a second user equipment; therefore, sending paging messages through different paging channels or limiting a paging occasion for the second user equipment to a first time length mitigates impact of the second user equipment corresponding to the first user equipment; for change information of a system broadcast message, when the change information of the system broadcast message is sent to the first user equipment, selecting a paging channel different from that of the second user equipment or limiting the paging occasion for the second user equipment to the first time length reduces a time length for sending the change information of the system broadcast message to the first user equipment, and reduces extra electricity consumed by the first user equipment. A changed system broadcast message starts to be sent before all second user equipments are notified, which reduces a delay time for sending the changed system broadcast message.

Embodiment 8

Figure 8:
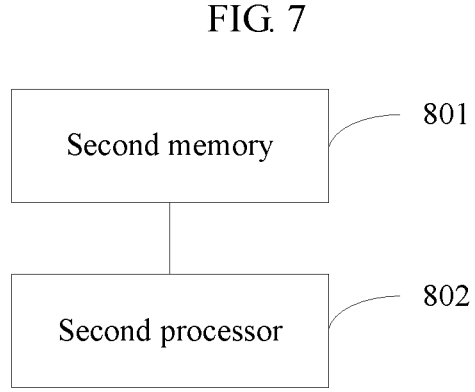
FIG. 8 is a schematic structural diagram of another apparatus for receiving a paging message according to Embodiment 8 of the present invention.
Figure 9:
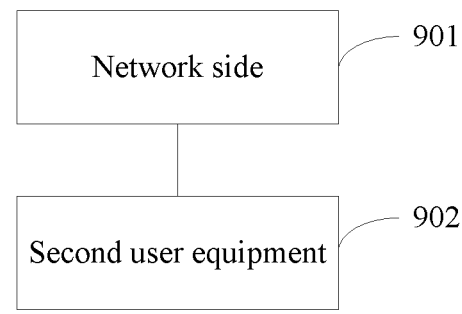
FIG. 9 is a schematic structural diagram of a system for sending a paging message according to Embodiment 9 of the present invention.

This embodiment of the present invention provides an apparatus for receiving a paging message. Referring to FIG. 8, the apparatus includes a second memory 801 and a second processor 802, configured to perform the following method for receiving a paging message, where the method includes:

acquiring rule information included in a system broadcast message, where the rule information includes a quantity of page indicator channels and further includes a preset threshold and/or a correspondence between a user equipment type and a paging channel;

selecting a paging channel according to the rule information, where the paging channel includes a page indicator channel PICH channel or includes a PICH channel and a paging-message-bearer channel;

calculating a paging occasion, listening to the selected PICH channel within the paging occasion, and parsing a page indicator value in the PICH channel that is listened to; and if the page indicator value is 1, receiving, from the paging-message-bearer channel, a paging message sent by a network side, where the paging message carries paging data.

The selecting a paging channel according to the rule information includes:

if the quantity of page indicator channels is greater than or equal to 2, acquiring, according to a user equipment type of paged user equipment, a corresponding paging channel from the correspondence between a user equipment type and a paging channel.

The selecting a paging channel according to the rule information includes:

if a discontinuous reception period length of a user equipment is greater than the preset threshold, selecting a second paging channel.

The calculating a paging occasion includes:

calculating the paging occasion according to an international mobile subscriber identity IMSI, a first time length, and a discontinuous reception period length of the paged user equipment.

Further, the method further includes:

acquiring, from the system broadcast message, the discontinuous reception period length of the paged user equipment and/or the first time length.

When the paging data is change information of the system broadcast message, after the receiving, from the paging-message-bearer channel, a paging message sent by a network side, the method further includes:

receiving, according to the change information of the system broadcast message, a changed system broadcast message sent by the network side, where the change information of the system broadcast message includes a first system frame number SFN and/or a change time point of the system broadcast message.

The receiving, according to the change information of the system broadcast message from the paging-message-bearer channel, a changed system broadcast message sent by the network side includes:

comparing a current time point with the change time point included in the change information of the system broadcast message;

if the current time point is later than or equal to the change time point of the system broadcast message, receiving the changed system broadcast message sent by the network side; and if the current time point is earlier than the change time point of the system broadcast message, continuing waiting and receiving, at the change time point of the system broadcast message, the changed system broadcast message sent by the network side.

Optionally, the receiving, according to the change information of the system broadcast message, a changed system broadcast message sent by the network side includes:

acquiring a second SFN at which the change information of the system broadcast message is received;

if the first SFN is greater than or equal to the second SFN, receiving, at the first SFN according to scheduling information, the changed system broadcast message sent by the network side, where a master information block MIB of the system broadcast message or a scheduling block of the system broadcast message includes the scheduling information; and if the first SFN is less than the second SFN, receiving, according to the scheduling information at a first SFN included in a next SFN period, the changed system broadcast message sent by the network side.

Further, the method further includes:

if a third SFN corresponding to a current time point does not reach the first SFN and uplink data needs to be sent, acquiring the MIB of the system broadcast message; and if the acquired MIB is different from a MIB that has been stored, determining that the system broadcast message changes, and acquiring the changed system broadcast message.

Optionally, the receiving, according to the change information of the system broadcast message, a changed system broadcast message sent by the network side includes:

after receiving the change information of the system broadcast message, acquiring a MIB of the system broadcast message; and if the acquired MIB is different from a MIB that has been stored, receiving the changed system broadcast message sent by the network side.

In this embodiment of the present invention, a paging occasion for a second user equipment is calculated by using a first time length, so that occasions for paging the second user equipment by a network side are concentrated within the first time length, which mitigates impact on paging first user equipment; for sending a paging message for a change of a system broadcast message, a time length for sending change information of the system broadcast message to the first user equipment is reduced, and extra electricity consumed by a UE whose discontinuous reception period length is relatively small is reduced. The network side may send the change information of the system broadcast message before the second user equipment is notified, which reduces a delay time for receiving the changed system broadcast message by the first user equipment.

Embodiment 9

Referring to 9, this embodiment of the present invention provides a system for sending a paging message, and the system includes the network side apparatus described in Embodiment 5 and the second user equipment described in Embodiment 6.

In this embodiment of the present invention, a discontinuous reception period length of a first user equipment is less than a discontinuous reception period length of a second user equipment; therefore, sending paging messages through different paging channels or limiting a paging occasion for the second user equipment to a first time length mitigates impact of the second user equipment corresponding to the first user equipment; for change information of a system broadcast message, when the change information of the system broadcast message is sent to the first user equipment, selecting a paging channel different from that of the second user equipment or limiting the paging occasion for the second user equipment to the first time length reduces a time length for sending the change information of the system broadcast message to the first user equipment, and reduces extra electricity consumed by the first user equipment. A changed system broadcast message starts to be sent before all second user equipments are notified, which reduces a delay time for sending the changed system broadcast message.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A user equipment, comprising:
a memory; and
a processor;
the memory is configured to a store program for receiving a paging message;
the processor is configured to implement the program stored in the memory, including:
acquiring rule information included in a system broadcast message, where the rule information includes a quantity of page indicator channels and further includes a preset threshold and/or a correspondence between a user equipment type and a paging channel;
selecting a paging channel according to the rule information, where the paging channel includes a page indicator channel (PICH) channel or includes a PICH channel and a paging-message-bearer channel;
calculating a paging occasion, listening to the selected PICH channel within the paging occasion, and parsing a page indicator value in the PICH channel that is listened to;
when the page indicator value is 1, receiving, from the paging-message-bearer channel, a paging message sent by a network side, where the paging message carries paging data; and
when a discontinuous reception period length of a user equipment is greater than the preset threshold, selecting a second paging channel.

2. The apparatus according to claim 1, wherein the processor is configured to:
calculate the paging occasion according to an international mobile subscriber identity (IMSI), a first time length, and the discontinuous reception period length of paged user equipment.

3. The apparatus according to claim 2, wherein the processor is further configured to:
acquire, from the system broadcast message, the discontinuous reception period length of the paged user equipment and/or the first time length.

4. The apparatus according to claim 1, wherein when the paging data is change information of the system broadcast message,
the processor is further configured to:
receive, according to the change information of the system broadcast message, a changed system broadcast message sent by the network side, wherein the change information of the system broadcast message comprises a first system frame number (SFN) and/or a change time point of the system broadcast message after receiving, from the paging-message-bearer channel, a paging message sent by the network side.

5. A user equipment, comprising:
a memory; and
a processor;
the memory is configured to a store program for receiving a paging message;
the processor is configured to implement the program stored in the memory, including:
acquiring rule information included in a system broadcast message, where the rule information includes a quantity of page indicator channels and further includes a preset threshold and/or a correspondence between a user equipment type and a paging channel;
selecting a paging channel according to the rule information, where the paging channel includes a page indicator channel (PICH) channel or includes a PICH channel and a paging-message-bearer channel;
calculating a paging occasion, listening to the selected PICH channel within the paging occasion, and parsing a page indicator value in the PICH channel that is listened to;
when the page indicator value is 1, receiving, from the paging-message-bearer channel, a paging message sent by a network side, where the paging message carries paging data,
wherein when the paging data is change information of the system broadcast message, the processor is configured to:
receive according to the change information of the system broadcast message, a changed system broadcast message sent by the network side, wherein the change information of the system broadcast message comprises a first system frame number (SFN) and/or a change time point of the system broadcast message after receiving, from the paging-message-bearer channel, a paging message sent by the network side;
when the change information of the system broadcast message comprises the change time point:
compare a current time point with the change time point;
when the current time point is later than or equal to the change time point of the system broadcast message, receive the changed system broadcast message sent by the network side; and
when the current time point is earlier than the change time point of the system broadcast message, continue waiting and receive, at the change time point of the system broadcast message, the changed system broadcast message sent by the network side.

6. A user equipment, comprising:
a memory; and
a processor;
the memory is configured to a store program for receiving a paging message;
the processor is configured to implement the program stored in the memory, including:
acquiring rule information included in a system broadcast message, where the rule information includes a quantity of page indicator channels and further includes a preset threshold and/or a correspondence between a user equipment type and a paging channel;
selecting a paging channel according to the rule information, where the paging channel includes a page indicator channel (PICH) channel or includes a PICH channel and a paging-message-bearer channel;
calculating a paging occasion, listening to the selected PICH channel within the paging occasion, and parsing a page indicator value in the PICH channel that is listened to;
when the page indicator value is 1, receiving, from the paging-message-bearer channel, a paging message sent by a network side, where the paging message carries paging data,
wherein when the paging data is change information of the system broadcast message, the processor is configured to:
receive, according to the change information of the system broadcast message, a changed system broadcast message sent by the network side, wherein the change information of the system broadcast message comprises a first system frame number (SFN) and/or a change time point of the system broadcast message after receiving, from the paging-message-bearer channel, a paging message sent by the network side;

when the change information of the system broadcast message comprises a first system frame number (SFN):
  acquire a second SFN at which the change information of the system broadcast message is received;
  when the first SFN is greater than or equal to the second SFN, receive, at the first SFN according to scheduling information, the changed system broadcast message sent by the network side, wherein a master system information block (MIB) of the system broadcast message or a scheduling block of the system broadcast message comprises the scheduling information; and
  when the first SFN is less than the second SFN, receive, according to the scheduling information at a first SFN comprised in a next SFN period, the changed system broadcast message sent by the network side.

7. The apparatus according to claim 6, wherein the processor is further configured to:
  when a third SFN corresponding to a current time point does not reach the first SFN and uplink data needs to be sent, acquire the MIB of the system broadcast message; and
  when the acquired MIB is different from a MIB that has been stored, determine that the system broadcast message changes, and acquire the changed system broadcast message.

* * * * *